United States Patent
Rausch et al.

(10) Patent No.: US 9,711,935 B2
(45) Date of Patent: Jul. 18, 2017

(54) OPTICAL SCANNING

(71) Applicant: TOPTICA Photonics AG, Grafelfing (DE)

(72) Inventors: Christian Rausch, Unterhaching (DE); Andreas Brodschelm, Munich (DE); Nico Vieweg, Stockdorf (DE); Thomas A. Puppe, Munich (DE)

(73) Assignee: TOPTICA PHOTONICS AG, Grafelfing (DE)

( * ) Notice: Subject to any disclaimer, the term of this patent is extended or adjusted under 35 U.S.C. 154(b) by 0 days.

(21) Appl. No.: 15/237,379

(22) Filed: Aug. 15, 2016

(65) Prior Publication Data

US 2017/0047705 A1 Feb. 16, 2017

(30) Foreign Application Priority Data

Aug. 13, 2015 (DE) .................... 10 2015 113 355

(51) Int. Cl.
*H01S 3/10* (2006.01)
*H01S 3/13* (2006.01)
(Continued)

(52) U.S. Cl.
CPC ............ *H01S 3/1305* (2013.01); *H01S 3/067* (2013.01); *H01S 3/09* (2013.01); *H01S 3/10046* (2013.01);
(Continued)

(58) Field of Classification Search
CPC ...... H01S 3/1305; H01S 3/1307; H01S 3/136; H01S 3/1053; H01S 3/2383; H01S 3/067;
(Continued)

(56) References Cited

U.S. PATENT DOCUMENTS

2010/0002737 A1* 1/2010 Rausch ................... G01J 3/10
372/30
2011/0080580 A1* 4/2011 Fermann ............... G01N 21/31
356/301

(Continued)

*Primary Examiner* — Kinam Park
(74) *Attorney, Agent, or Firm* — Raymond R. Ferrera; Adams and Reese LLP

(57) ABSTRACT

The invention relates to an apparatus for generating temporally spaced apart light pulses, comprising
  a first laser (11) which generates a first sequence (I) of light pulses at a first repetition rate,
  a second laser (12) which generates a second sequence (II) of light pulses at a second repetition rate, and
  at least one actuating member which influences the first repetition rate and/or the second repetition rate. It is an object of the invention to provide an apparatus for generating temporally spaced apart light pulses which is improved in relation to the prior art. This object is achieved by the invention by a control element (23) which applies a periodic modulation signal (24) to the actuating member for periodic variation of the first repetition rate and/or the second repetition rate, wherein the actuating member comprises a mechanical oscillator excited by the modulation signal (24), the deflection of said oscillator causing an adjustment in the resonator length of the first laser (11) and/or second laser (12), wherein the mechanical oscillator oscillates in resonant fashion at the frequency of the modulation signal (24). In accordance with the invention, an actuator (e.g. a piezo-actuator) which adjusts the resonator length of the laser is operated in resonant fashion. As a result, a large maximum time offset of the light-pulse sequences (I, II) with, at the same time, a high scanning speed is rendered possible. Moreover, the invention relates to a method for generating temporally spaced apart light pulses.

14 Claims, 3 Drawing Sheets

(51) Int. Cl.
  *H01S 3/09*   (2006.01)
  *H01S 3/105*  (2006.01)
  *H01S 3/23*   (2006.01)
  *H01S 3/067*  (2006.01)
  *H01S 3/136*  (2006.01)
  *H01S 3/11*   (2006.01)

(52) U.S. Cl.
  CPC ........ *H01S 3/1053* (2013.01); *H01S 3/10053* (2013.01); *H01S 3/1121* (2013.01); *H01S 3/136* (2013.01); *H01S 3/1307* (2013.01); *H01S 3/2383* (2013.01); *H01S 3/1112* (2013.01); *H01S 3/1118* (2013.01)

(58) Field of Classification Search
  CPC .. H01S 3/1118; H01S 3/1112; H01S 3/10053; H01S 3/1121; H01S 3/10046
  See application file for complete search history.

(56) References Cited

U.S. PATENT DOCUMENTS

2013/0148128 A1\* 6/2013 Fermann ................ G01N 21/31
                                                   356/450
2015/0357788 A1\* 12/2015 Puppe ................. H01S 3/10046
                                                   372/18

\* cited by examiner

OPTICAL SCANNING

The invention relates to an apparatus for generating temporally spaced apart light pulses, comprising
- a first laser which generates a first sequence of light pulses at a first repetition rate,
- a second laser which generates a second sequence of light pulses at a second repetition rate, and
- at least one actuating member which influences the first repetition rate and/or the second repetition rate.

Such apparatuses are used e.g. for ultra-fast time-resolved spectroscopy. Here, use is usually made of mode-coupled lasers. So-called pump-probe techniques are used to measure and examine the time profile of physical or chemical processes. Such techniques have led to remarkable advances in various scientific and technical fields. Examinations in respect of relaxation dynamics in solids, liquids and gases, time-resolved terahertz spectroscopy and signal analysis in optical communication technology are noteworthy. Mode-coupled lasers are used as light pulse sources in synchrotron radiation sources in order to control the generation of electron beams in time and also analyze the temporal behavior of electron, UV or x-ray pulses. What is common to all these applications is that the arrival times of the light pulses at an interaction center of the respective experiment must be precisely controllable. Usually, the arrival times or the time intervals between successively incident light pulses must be variable within a specific interval in order thus to be able to scan the time profile of the physical, technical or chemical process to be examined.

DE 20 2008 009 021 U1 has disclosed an apparatus of the type set forth at the outset, in which a control signal within a control loop is formed from the light-pulse sequences of the two lasers by means of a phase detector, wherein the control loop comprises a controller which generates an actuating signal which is influenced by the repetition rate of the light-pulse sequence of one of the two lasers. By changing the repetition frequency, i.e. the reference variable, a leading or following of the light-pulse sequence of one laser in relation to the light-pulse sequence of the other laser is generated in a targeted manner by means of the controller. Here, the controller sets the repetition rate in such a way that the desired phase, i.e. the desired time offset, is set.

Although the previously known apparatus is advantageous in that the time offset between the light-pulse sequences can be freely predetermined, this only applies, however, within certain boundaries. A piezo-actuator carrying a reflective optical element (a mirror) is used as actuating member for setting a time offset. The resonator length of the laser is changed by the translation of the mirror by means of the piezo-actuator and the time offset of the light pulses is set thereby. Here, the maximum deflection of the piezo-actuator, in combination with the regulating concept, determines the maximum achievable scanning speed, i.e. the maximum variation speed of the time offset of the two light-pulse sequences. The maximum deflection of conventional piezo-actuators, which are operated by corresponding conventional drivers, is restricted. Accordingly, the maximum achievable scanning speed with the known apparatus is also restricted. Furthermore, the control of the repetition rate of one of the two lasers pursuant to DE 20 2008 009 021 U1 is disadvantageous in that the scanning speed is also restricted by the bandwidth of the control loop. In the case of fast pump-probe experiments (once again e.g. in time-resolved terahertz spectroscopy), a scanning speed in the region of 1 kHz or more is sought-after, meaning the whole scanning range should be periodically scanned at this frequency. There are significant signal distortions at such high scanning speeds due to the properties of the control loop. A consequence thereof is that the time axis of the experiment, i.e. the precise time interval between each individual pump light pulse and probe light pulse, is no longer precisely reconstructable.

There exist applications in which a large maximum time offset (of 1 ns or even more) with, at the same time, a high scanning speed is desirable. An example lies in the thickness measurement of workpieces in industrial production lines. The apparatus known from DE 20 2008 009 021 U1 is hardly suitable for such applications.

Against this backdrop, the invention is based on the object of providing an improved apparatus for generating temporally spaced apart light pulses.

Proceeding from an apparatus of the type set forth at the outset, the invention achieves this object by a control element which applies a periodic modulation signal to the actuating member for periodic variation of the first repetition rate and/or the second repetition rate, wherein the actuating member comprises a mechanical oscillator excited by the modulation signal, the deflection of said oscillator causing an adjustment in the resonator length of the first laser and/or second laser, wherein the mechanical oscillator in resonant fashion oscillates at the frequency of the modulation signal.

Thus, according to the invention, the mechanical oscillator adjusting the resonator length of the laser is operated in resonant fashion.

In one preferred refinement, the mechanical oscillator comprises a first actuator, in particular a piezo-actuator, which carries a reflective optical element (or in which the piezo-crystal itself is mirrored) and, by translation of same, adjusts the resonator length of the first laser and/or the second laser. A micromechanical actuator or a voice coil actuator could also be conceivable. The adjustment of the resonator length could also be effected (without a reflective optical element) by a fiber stretcher, which is acted upon by the mechanical oscillator or actuator.

For most applications, the exact scanning speed at which the measurement takes place is of secondary importance, as long as the scanning speed is only sufficiently high. Normally, there is no need to set the scanning speed. The invention exploits this fact by virtue of the mechanical oscillator being operated at the resonant frequency thereof, e.g. at the frequency which corresponds to the resonant frequency of the mechanical oscillator formed by the piezo-actuator and the reflective optical element carried thereby.

Within the meaning of the invention, resonant does not necessarily mean that the frequency of the modulation signal is exactly equal to the resonant frequency of the mechanical oscillator. What is decisively important is that the deflection is (clearly) magnified in relation to the non-resonant operation. As a result of the magnification factor, it is possible for substantially larger deflections to arise than in the static case or in the case of (small) frequencies away from the resonance. As a result, a correspondingly larger adjustment range of the resonator length and hence a greater maximum variation speed of the time offset of the light-pulse sequences are obtained.

The achievable magnification factor depends on the construction of the piezo-actuator (e.g. the ceramic material used therein) and corresponds to a factor of up to 10 in the case of typical piezo-actuators. In the case of piezo-actuators which are used in e.g. high quality ultrasonic oscillators, the magnification can correspond to a factor of up to 1000. Preferably, the mechanical oscillator formed by the first piezo-actuator and the reflective optical element carried thereby should have a quality which is at least 5, preferably at least 10, particularly preferably at least 100.

In principle, the modulation signal can be any periodic time signal, which is e.g. generated by means of a function generator as a control element, wherein it is possible to set the amplitude and/or the frequency of the modulation signal.

The piezo-actuator and the mass of the reflective optical element can advantageously be selected in a targeted manner in such a way that the resonant frequency of this spring-mass-damper system corresponds to the desired scanning speed.

In accordance with the invention, the repetition rate of one of the two light-pulse sequences (or of both light-pulse sequences simultaneously) is influenced directly. The periodically varying modulation signal is directly applied to the mechanical oscillator influencing the repetition rate, and so unwanted distortions as a result of an interposed closed-loop control, as a proposed in the prior art, are avoided. Therefore, the invention enables a high scanning speed which, in particular, is not limited by the bandwidth of a phase control. Moreover, the invention enables a precise calibration of the time axis since the respectively currently applied repetition rates, and hence the time offset between the light pulses of the two lasers, can be derived directly from the modulation signal. In accordance with the invention, the time axis is not influenced by the closed-loop control, independently of the scanning speed. A particular advantage in this context is that, for example, a piezo-actuator operated in resonant fashion oscillates very harmonically as an oscillator.

Hence, according to the invention, a large maximum time offset of the light pulses is enabled with, at the same time, a high scanning speed.

It is also advantageous that the piezo-amplifiers required for the apparatus according to the invention are very economical in production and operation. Further advantages emerge from a small installation size of the system and a lower heat influx compared to the prior art.

In a possible refinement of the apparatus according to the invention, provision can be made of a first control loop in order to ensure stable coupling of the two light-pulse trains to one another. Preferably, this control loop comprises a phase detector which derives a system deviation signal from the first light-pulse sequence and the second light-pulse sequence, and a first controller which forms a first actuating signal from the system deviation signal, applies the first actuating signal to the actuating member and thus regulates the time offset, averaged over a period of the modulation signal, between the first light-pulse sequence and the second light-pulse sequence. Hence, the first control loop is nothing but a phase loop which keeps the mean time offset, i.e. the mean phase difference between the two light-pulse sequences, at a predeterminable value constant in time. The bandwidth of the first control loop may in this case lie significantly below the frequency of the modulation signal. In one possible refinement, a filter element is disposed upstream of the first controller, said filter element filtering out signal components in the system deviation signal at higher frequencies, i.e., in particular, in the region of the frequency of the modulation signal, in order to achieve that in fact only the average time offset of the two light-pulse sequences is controlled and the closed-loop control remains uninfluenced from the actuation of the first piezo-actuator with the modulation signal.

In one possible refinement of the closed-loop control described above, provision is made of a superposition member which superposes the first actuating signal and the modulating signal and applies the superimposed signal to the actuating member. Hence, in this refinement, the first actuator is actuated both by the first actuating signal generated by the closed-loop control and by the modulation signal. The first actuator therefore has a dual function, namely the phase coupling of the two light-pulse sequences and, at the same time, the resonant modulation of the repetition rate of the first and/or second laser.

Alternatively, the actuating member can comprise a second actuator (e.g. likewise a piezo-actuator) which likewise changes the resonator length of the first laser and/or the second laser, wherein the controller only applies the first actuating signal to the second actuator while the first actuator is only actuated with the modulation signal by the control element. In this case, the first actuator is only responsible for the resonant modulation of the resonator length, while the actuator is only responsible for the phase coupling of the two light-pulse sequences. In one possible refinement, the first actuator and the second actuator are arranged in a stack such that e.g. the translation of a reflective optical element corresponds to the sum of the deflections of the two actuators.

In a further preferred refinement, the apparatus according to the invention comprises a second control loop with a deflection sensor which detects the amplitude of the oscillation of the first piezo-actuator, and a second controller which derives a second actuating signal from the signal of the deflection sensor, applies the second actuating signal to the control element and thus regulates the amplitude, phase and/or frequency of the modulation signal. The second control loop serves to actuate the mechanical oscillator in such a way that the deflection of the actuator has the desired amplitude. The deflection sensor detects the current maximum deflection of the oscillating actuator. The second controller compares the signal of the deflection sensor with a (predeterminable) setpoint value and varies the amplitude, phase and/or frequency of the modulation signal accordingly by actuation of the control element in order to adjust the maximum deflection to the desired value. The apparatus according to the invention can be adapted to the requirements of the respective application by predetermining the setpoint value of the maximum deflection. By way of example, in the application of the apparatus according to the invention for fast time-resolved spectroscopy, the scanning range can be adapted precisely to the timescale of the examined dynamic processes.

By way of example, mode-coupled lasers are suitable as lasers for the apparatus according to the invention. In particular, the apparatus according to the invention can advantageously be realized with fiber lasers. Fiber-laser systems on the basis of erbium-doped fibers have proven their worth in experiments. Such mode-coupled fiber lasers, which emit light-pulse sequences at repetition rates in the region of 100 MHz, are advantageously commercially available as pre-manufactured units. Such systems were found to be very robust. A substantial advantage is that the apparatus according to the invention with a mode-coupled fiber laser can be used for all of the applications mentioned at the outset.

Using the apparatus according to the invention, it is possible to realize a method for generating temporally spaced apart light pulses, comprising the following method steps:
generating a first sequence of light pulses at a first repetition rate by means of a first laser,
generating a second sequence of light pulses at a second repetition rate by means of a second laser and periodically varying the first repetition rate and/or the second repetition rate by means of a mechanical oscillator, the deflection of which brings about an adjustment in the resonator length of the first laser and/or second laser, wherein the mechanical oscillator oscillates in resonant fashion. Using this, it is possible to periodically vary the time offset of the two light-pulse sequences for the applications mentioned at the outset, to be precise with a large maximum time offset and, at the same time, a high scanning speed. The scanning speed corresponds to the frequency of the modulation signal, i.e. the resonant frequency of the mechanical oscillator made of piezo-actuator and reflective optical element.

Exemplary embodiments of the invention are explained in more detail below on the basis of the drawings. In detail:

Figure 1:
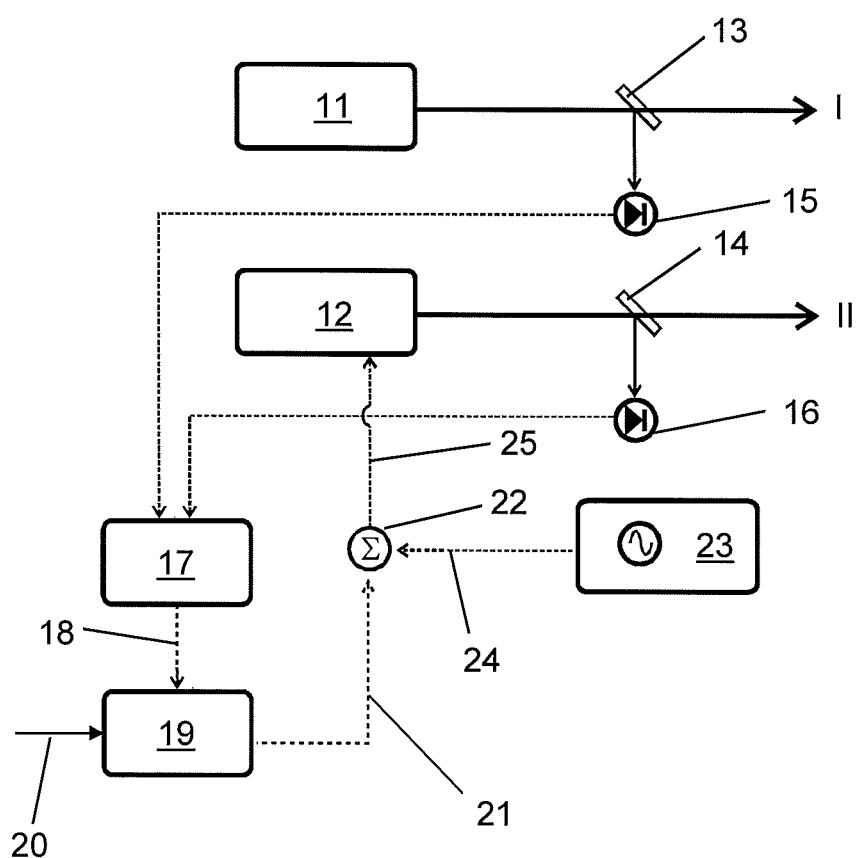
FIG. 1 shows an illustration of the open-loop and closed-loop control concept of the apparatus according to the invention in a block diagram.

The apparatus in accordance with FIG. 1 comprises two mode-coupled fiber lasers 11 and 12, which emit light-pulse sequences I and II. Some of the laser light of the light-pulse sequences I and II is guided to photodiodes 15 and 16 via beam splitters 13 and 14. The signals generated by the photodiodes 15 and 16 are fed to a phase detector (e.g. mixer) 17. Filters (not depicted here) can be disposed upstream of the phase detector 17, said filters filtering out signal components at harmonics of the repetition rates of the light-pulse sequences I and II. Likewise, phase shifters (not depicted here) may be disposed upstream of the phase detector 17. At the output thereof, the phase detector 17 generates a phase signal 18. The phase signal 18 is applied to the input of a PID controller 19. A further frequency-selective filter (not depicted here) can be disposed upstream between the phase detector 17 and the PID controller 19 in order to filter out unwanted (in particular relatively high frequency) components of the system deviation signal 18. In accordance with the system deviation as the difference of the phase signal 18 from an externally predeterminable setpoint value 20, the PID controller 19 generates an actuating signal 21. A modulation signal 24 generated by a control element (function generator) 23 is superposed on the actuating signal 21 by means of a superposition member (adder) 22. The actuating signal 25 modified thus is fed to an actuating member (not depicted in any more detail in FIG. 1) of the fiber laser 12. The actuating signal 25 generated by the superposition acts on the repetition rate of the light-pulse sequence II emitted by the fiber laser 12. To this end, the actuating signal 25 actuates a piezo-actuator integrated into the fiber laser 12, by means of which piezo-actuator the resonator length of the fiber laser 12 is adjusted. The piezo-actuator carries a mirror of the resonator of the fiber laser 12 such that the resonator length changes as a result of the translation of the mirror. The frequency of the modulation signal 24 determines the scanning frequency of the apparatus, i.e. the frequency with which the time offset between the light-pulse sequences I and II varies periodically. According to the invention, the arrangement made of piezo-actuator and mirror oscillates in resonant fashion at the frequency of the modulation signal 24. This means that the piezo-actuator is operated at the frequency which corresponds to the resonant frequency of the mechanical oscillator formed by the piezo-actuator and the mirror carried thereby (mass-spring-damper system). What is employed hereby is that the deflection of the piezo-actuator oscillating in resonant fashion is (significantly) magnified in comparison with the non-resonant operation. As a result of the magnification factor, it is possible, as explained above, for significantly larger deflections of the piezo-actuator to arise here than away from the resonance. As a result, a correspondingly large adjustment range of the resonator length, and hence a high variation speed of the time offset of the light-pulse sequences I, II, is obtained. The piezo-actuator and the mass of the employed mirror are selected in a targeted manner in such a way that the resonant frequency of this spring-mass-damper system results in the desired scanning speed. The phase loop formed by the phase detector 17 and the controller 19 is designed in such a way in respect of the control bandwidth (e.g. by way of suitable low-pass filtering of the phase signal 18 with a limit frequency below the frequency of the modulation signal 24) that it regulates the time offset, averaged over a period of the modulation signal 24, of the first light-pulse sequence I and the second light-pulse sequence II. Then, the time offset of the two light-pulse sequences I, II varies periodically with the frequency of the modulation signal 24 about this regulated mean temporal offset.

Reference is made to the fact that the components of the control loop (function generator, phase actuator, controller, superposition member, control element, etc.) depicted in FIG. 1 can be realized by discrete electronic components or else by an implementation using software, e.g. in a microcontroller or signal processor.

Figure 2:
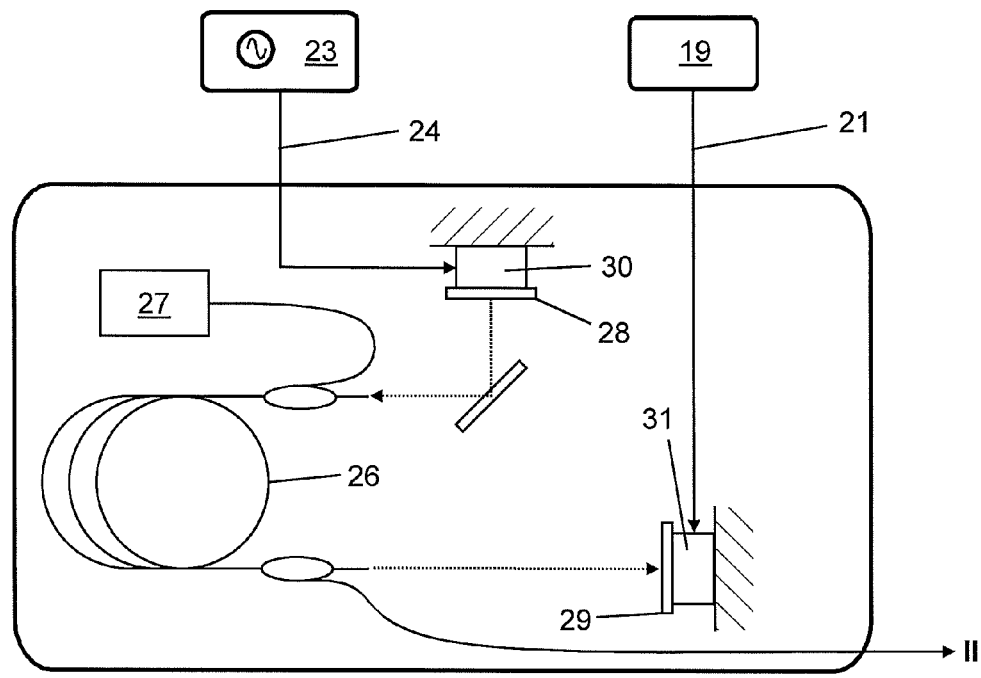
FIG. 2 shows a schematic illustration of one of the lasers of the apparatus according to the invention, with two piezo-actuators for varying the repetition rate by adjusting the resonator length.

FIG. 2 schematically shows the laser 12 of the apparatus depicted in FIG. 1. As an active optical medium which is pumped by laser diode 27, the laser 12 comprises a light-guiding fiber 26 which is e.g. doped with erbium ions. Together with the two end mirrors 28, 29, the fiber 26 forms an optical resonator. The mirror 29 is a saturable absorber mirror (SESAM) such that, overall, a mode-coupled laser is formed, said laser emitting femtosecond pulses at a repetition rate corresponding to the length of the resonator and hence to the circulation period of the light pulses in the resonator. A first piezo-actuator 30 carries a mirror 28 while a second piezo-actuator 31 carries the mirror 29. Both the translation of the mirror 28 by means of the piezo-actuator 30 and the translation of the mirror 29 by means of the piezo-actuator 31 adjust the resonator length and hence the repetition rate of the laser 12. In the depicted exemplary embodiment, the first piezo-actuator 30 is actuated by the control element 23 and the modulation signal 24 is correspondingly applied thereon such that, according to the invention, the first piezo-actuator 30 with the mirror 28 oscillates in resonant fashion. The second piezo-actuator 31 is actuated by the PID controller 19 and thus brings about the phase coupling of the light-pulse sequence II of the laser 12 to the light-pulse sequence I of the laser 11 (not depicted in FIG. 2). Due to the separate actuation of the two piezo-actuators 30, 31 in this embodiment, the superposition member 22 depicted in FIG. 1 can be dispensed with. The requirements on the two piezo-actuators 30, 31 are different. The actuator 30 can be selected with different properties to the actuator 31, which e.g. can be selected with a greater travel and a higher electric capacitance or else with a smaller capacitance for a high control bandwidth. The other actuator 30 is optimized for oscillating in resonant fashion.

Figure 3:
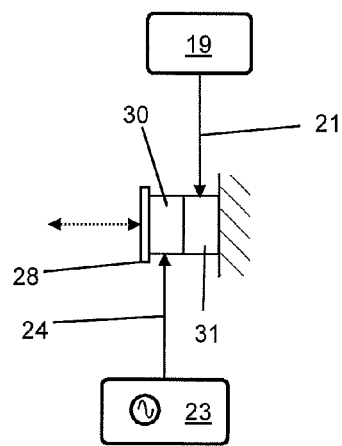
FIG. 3 shows a schematic illustration of a refinement with two piezo-actuators in a stack.

In the variant depicted in FIG. 3, the two piezo-actuators 30, 31 are arranged in a stack such that the translation of the mirror 28 corresponds to the sum of the deflections of the two piezo-actuators 30, 31. Therefore, in this refinement, only the mirror 28 is moved, while the other mirror 29 (not depicted in FIG. 3) remains stationary. In this variant, the two actuators 30, 31 are selected in terms of their properties in such a way that one actuator 31 is optimized for the closed-loop control and the other actuator 30 is optimized for oscillating in resonant fashion.

Figure 4:
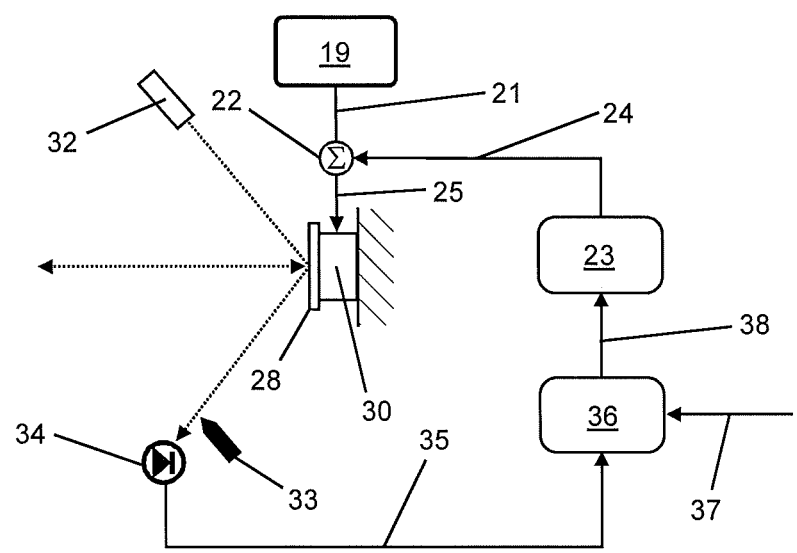
FIG. 4 shows a schematic illustration of a refinement with a single piezo-actuator and with closed-loop control of the resonant frequency.

In the exemplary embodiment shown in FIG. 4, use is made of only a single piezo-actuator 30, with the superposed actuating signal 25 (see FIG. 1) being applied thereto. Here, the actuating signal 25 is either generated by the generator 23, with the frequency of the actuating signal 25 being set to the mechanical resonant frequency of the oscillator formed by the mirror 28 and the piezo-actuator 30. Alternatively, provision can be made of a self-oscillating arrangement, wherein the frequency is set automatically to the mechanical resonant frequency of the oscillator by suitable feedback. A further control loop which has a deflection sensor for detecting the amplitude of the oscillation of the piezo-actuator 30 is provided in the exemplary embodiment. The deflection sensor comprises a light source 32, the light of which is reflected by the mirror 28, a stop 33 and a photodiode 34. The positioning of the stop 33 relative to the light beam causes the output signal 35 of the photodiode 34 to depend on the maximum deflection of the oscillating arrangement made of the piezo-actuator 30 and the mirror 28. The signal 35 is fed to a further PID controller 36, which compares the detected deflection of the piezo-actuator 30 with an externally predetermined setpoint value 37 and derives a signal 38 for actuating the control element 23 therefrom. Using this, the PID controller 36 controls the frequency of the modulation signal 24 in order to set the desired deflection of the piezo-actuator 30. Alternatively, the PID controller 36 can control the amplitude of the modulation signal 24 in order to set the desired deflection. This lends itself to the above-described self-oscillating excitation of the mechanical oscillator. Alternatively, a capacitive sensor or an acoustic sensor, which detects the sound level emitted by the oscillating piezo-actuator 30, said sound level depending directly on the deflection amplitude of the piezo-actuator 30, may be used as a deflection sensor.

The invention claimed is:

1. Apparatus for generating temporally spaced apart light pulses, comprising
    a first laser (11) which generates a first sequence (I) of light pulses at a first repetition rate,
    a second laser (12) which generates a second sequence (II) of light pulses at a second repetition rate, and
    at least one actuating member which influences at least one of the first repetition rate and the second repetition rate,
further comprising a control element (23) which applies a periodic modulation signal (24) to the actuating member for periodic variation of at least one of the first repetition rate and the second repetition rate, wherein the actuating member comprises a mechanical oscillator excited by the modulation signal (24), the deflection of said oscillator causing an adjustment in the resonator length of at least one of the first laser (11) and second laser (12), wherein the mechanical oscillator oscillates in resonant fashion at the frequency of the modulation signal (24).

2. Apparatus according to claim 1, wherein the mechanical oscillator comprises a first actuator, in particular a piezo-actuator (30), which carries a reflective optical element (28) and, by translation of same, adjusts the resonator length of at least one of the first laser (11) and the second laser (12).

3. Apparatus according to claim 1, further comprising a first control loop with
    a phase detector (17) which derives a phase signal (18) from the first light-pulse sequence (I) and the second light-pulse sequence (II), and
    a first controller (19) which forms a first actuating signal (21) from the phase signal, applies the first actuating signal (21) to the actuating member and thus regulates the time offset between the first light-pulse sequence (I) and the second light-pulse sequence (II).

4. Apparatus according to claim 3, further comprising a superposition member (22) which superposes the first actuating signal (21) and the modulation signal (24) and applies the superposed signal (25) to the actuating member.

5. Apparatus according to claim 3, characterized in that wherein the actuating member comprises a second actuator, in particular a piezo-actuator (31) which likewise changes the resonator length of at least one of the first laser (11) and the second laser (12), wherein the controller only applies the first actuating signal (21) to the second actuator.

6. Apparatus according to claim 5, wherein the first actuator and the second actuator are arranged in a stack such that the translation of the reflective optical element (28) corresponds to the sum of the deflections of the two actuators (30, 31).

7. Apparatus according to claim 1, further comprising a second control loop with
    a deflection sensor which detects the amplitude of the oscillation of the first actuator (30) and
    a second controller (36) which derives a second actuating signal (38) from the signal (35) of the deflection sensor, applies the second actuating signal (38) to the control element (23) and thus regulates at least one of the frequency, phase and amplitude of the modulation signal (24).

8. Apparatus according to claim 1, wherein the first light-pulse sequence (I) and the second light-pulse sequence (II) have a periodically varying time offset, wherein the maximum variation speed is at least 1 ps/ms.

9. Apparatus according to claim 1, wherein the first laser (11) and the second laser (12) are mode-coupled lasers.

10. Apparatus according to claim 9, wherein said mode-coupled lasers are fiber lasers.

11. Apparatus according to claim 1, wherein the quality of the mechanical oscillator is at least 5.

12. Apparatus according to claim 11, wherein the quality of the mechanical oscillator is at least 10.

13. Apparatus according to claim 11, wherein the quality of the mechanical oscillator is at least 100.

14. Method for generating temporally spaced apart light pulses, comprising the following method steps:
    generating a first sequence (I) of light pulses at a first repetition rate by means of a first laser (11),
    generating a second sequence (II) of light pulses at a second repetition rate by means of a second laser (12) and
    periodically varying at least one of the first repetition rate and the second repetition rate by means of the mechanical oscillator, the deflection of which brings about an adjustment in the resonator length of at least one of the first laser (11) and second laser (12), wherein the mechanical oscillator oscillates in resonant fashion.

\* \* \* \* \*